United States Patent [19]

Wiebke et al.

[11] 3,989,883

[45] Nov. 2, 1976

[54] FURNACE INSTALLATION OPERATED BY DIRECT ELECTRICAL HEATING ACCORDING TO THE RESISTANCE PRINCIPLE, IN PARTICULAR FOR THE PREPARATION OF SILICON CARBIDE

[75] Inventors: Günter Wiebke, Munich; Ludwig Korndörfer, Aising; Eugen Korndörfer, Heiligblut; Andreas Korsten, Balkhausen; Theodor Benecke; Fritz Petersen, both of Grefrath, all of Germany

[73] Assignee: Elektroschmelzwerk Kempten GmbH, Munich, Germany

[22] Filed: Dec. 10, 1974

[21] Appl. No.: 531,221

[30] Foreign Application Priority Data
Dec. 21, 1973 Germany............................ 2364108
Dec. 21, 1973 Germany............................ 2364106

[52] U.S. Cl. .................................... 13/23; 423/345
[51] Int. Cl.² ............................................... H05B 3/60
[58] Field of Search ...................... 13/1, 20, 23, 25; 423/345; 219/50, 523

[56] References Cited
UNITED STATES PATENTS
562,402  6/1896  King et al. ........................... 13/20 X
3,647,384  3/1972  Dessureault ......................... 13/25 X

*Primary Examiner*—R. N. Envall, Jr.
*Attorney, Agent, or Firm*—Burgess Ryan and Wayne

[57] ABSTRACT

An electrical resistance furnace installation, especially for the production of silicon carbide, has no side walls. In the one arrangement, the installation has two end walls, each provided with an electrode, with the resistive core for heating reacting valves extending between the electrodes at the end wall. In another arrangement, the installation has only one end wall, with the resistive core extending between an electrode in the one end wall, and a connection to a further electrode arranged in the bottom of the furnace. In a still further arrangement, the furnace has neither end walls nor side walls, and the resistive core is horizontally supported above the furnace floor and electrically connected through electrodes in the bottom of the furnace. The reacting ballast, in each embodiment, is poured onto the furnace floor to surround the resistive core for heating of the ballast.

2 Claims, 7 Drawing Figures

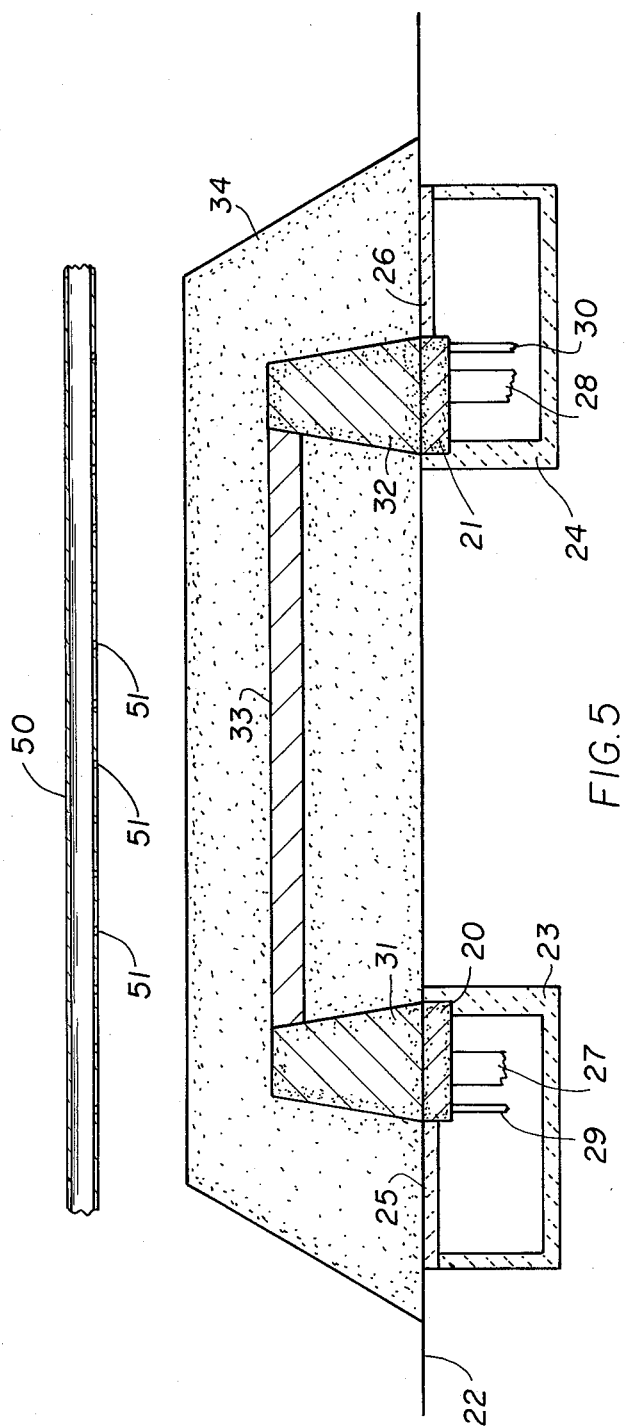
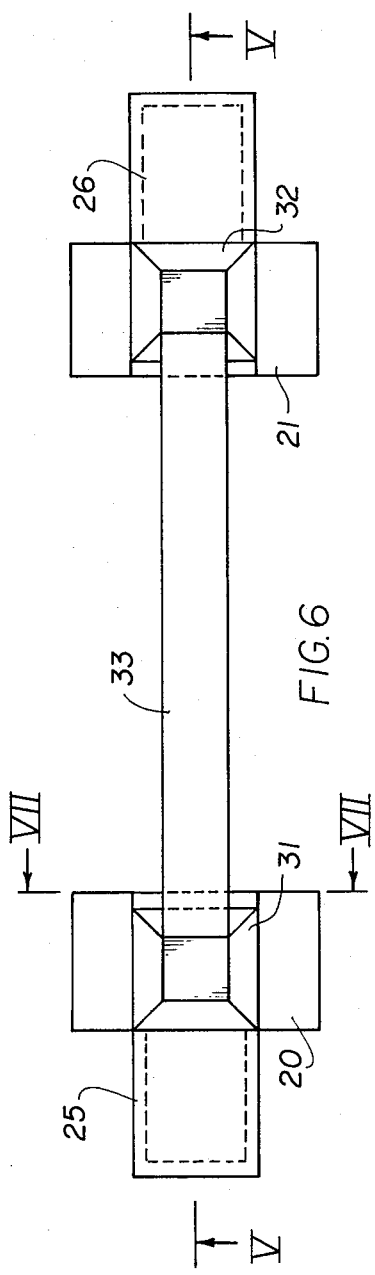

FURNACE INSTALLATION OPERATED BY DIRECT ELECTRICAL HEATING ACCORDING TO THE RESISTANCE PRINCIPLE, IN PARTICULAR FOR THE PREPARATION OF SILICON CARBIDE

This invention relates to electric resistive furnace, and more in particular, to resistive furnaces operating by direct electric heating, especially for the production of silicon carbide. It will be apparent, of course, that furnace installations in accordance with the invention may be employed in other processes. The present invention is related to the inventions disclosed in copending patent applications Ser. No. 531,236 filed Nov. 10, 1974 and Ser. No. 531,621 filed Dec. 11, 1974.

Industrial silicon carbide is prepared according to the discontinuous process in an electric resistance furnace, said process having been already worked out originally by Acheson. In view of the high production and sublimation temperature of the silicon carbide, in modern large-scale production plants there are also used stationary or movable horizontal resistance furnaces that differ from the Acheson furnace only by larger dimensions and a few improvements, for example, the use of finished parts for the furnace heads and the side walls and the bottom construction in tank furnaces. Those resistance furnaces can be used in the same manner for preparing electrographite, for example.

In most silicon carbide plants there are used stationary furnaces generally of rectangular construction, open on top and up to 20 m. long. The bottom and end walls are made of refractory bricks, while the side walls are removable. The current is supplied by graphite or carbon electrodes embedded in the end walls. In order to save space, these furnaces are arranged at a small distance from each other in the furnace room where are carried out all the working steps for operating the furnace such as filling, feeding current, the furnace heating proper and unloading. But due to the small distances between the individual furnaces, it is only possible to load and empty them with expensive crane apparatus, and the dust that results in the process must be taken care of additionally by ventilating means. The work of removal in the room is made difficult by the formation of a warm air current that produces the whirling up of dust, wherefore dust filters and apparatus for purifying contaminated air are required.

There have also become known already movable furnaces in which are used stationary filling stations with conveyor belts, movable chambers for the furnace heating, broaching supports for drawing the walls and spraying equipment for quickly cooling the silicon carbide roll, whereby the whole crane apparatus can be eliminated. But these furnace constructions are very expensive. Since in addition they cannot be made as long and wide as desired, they must necessarily be provided with high side walls. The emptying that takes place after removing the side walls by pushing down the whole charge is thereby associated with such a high amount of dust that can no longer be held under control by spraying with water. Thus, the removing work cannot be done outdoors but only indoors. Besides, the furnace construction is more susceptible to structural damage during transportation due to the continued shaking. The costs of the spacious railroad yard with the relatively highly strained foundations and travelling platforms are considerable.

However, the practice has shown that during the furnace travel not only the furnace heads with the electrodes embedded therein but alo the side walls are exposed to a very high wear and tear. Besides, the side walls often will perform their work of holding the burden in the furnace inefficiently inasmuch as solid components of the hot burden escape from the gaps between the separate wall elements and from the openings provided for degasification, and this is associated with undesirable dust and odors. Together with the high thermal stress due to the hot burden and the carbon monoxide that burns out, the mechanical stress due to the static load by the pressure of the burden is also considerable so that operable wall elements of stable iron frames filled with refractory material must be provided. But in those iron constructions there exists the danger that they can heat themselves inductively during the furnace travel due to the diminishing distance from the current carrier resulting from the growing SiC roll; besides, the current can also flow partly over the wall elements.

The disadvantages associated with the presence of side walls during the furnace cycle and with the removal of said walls when the furnace is stripped are practically completely avoided according to the invention by a simplified design of the furnace installation whereby not only a considerable saving of work is accomplished but also a substantialy lesser occurrence of dust, which is of extraordinary importance particularly with regard to the strict requirements relative to environmental protection.

The furnace installation according to the invention is operated by direct electric heating according to the resistance principle and in particular, is used for the preparation of silicon carbide from silica and carbonaceous material in intermittent operation, the current being supplied by electrodes through a resistance core made of carbon that is horizontally introduced in the burden consisting of a mixture of granular coke, quartz sand and added ingredients. The installation is operated without lateral and/or end limitation by wall elements.

The simplified design according to the invention is to be understood in the sense that furnace installations of conventional construction with two electrodes disposed at the front that are embedded in the furnace heads are operated without side walls. The burden needed for the reaction is here charged between the end walls that contain the electrodes in accordance with its natural charging cone.

However, the simplified design according to the invention has proved to be particularly satisfactory for furnace installations having their electrodes disposed as bottom electrodes according to copending application Ser. No. 531,236 filed Dec. 10, 1974 that are accordingly operated without end walls or side walls. Here the burden needed for the reaction is loaded over the bottom electrodes and the resistance core according to its natural cone and the installation is operated as an open mound furnace without walls, that is, without side and end limitation by wall elements.

Finally, with a combined arrangement of the electrodes, for example, with one side electrode and one electrode disposed as bottom electrode, the installation can be operated without side walls and with only one end wall.

The open ballasting can be made independently of the arrangement of the electrodes. But it requires more space and more burden material than in the case where it is enclosed by wall elements. But the high material cover has the advantage that the eruptive pressing out of gaseous reaction products during the furnace travel is rendered difficult, and thus these furnaces burn practically without so-called "blowers" which is very useful for environmental protection.

Besides, the furnace installations operated without lateral boundaries on the load are easily accessible. Thus, both the filling and the stripping thereof can be effected with simple conveyor vehicles or belts without the necessity for expensive crane apparatus. The open ballasting of course is not economical in the shop due to the great space required, and thus said furnaces are best operated as stationary outdoor installations.

This means that all steps for operating the the heating practice of the furnace such as filling, current feeding, furnace proper and emptying can be carried out outdoors without change of site.

An important condition for operating the heating cycle of the furnace outdoors results from the need that the surface of the burden be kept moist during the heating cycle, the cooling phase and the dismounting. Such moisture can be provided by any apparatus that produces a continuous or intermittent spraying.

The fact that in particular the furnace cycle can be carried out outdoors must be regarded as unexpected since this was considered impossible by technicians who held the opinion that the loss of burden could be considerable due to the action of the wind. By experimentation in an installation of the type according to the invention that is in operation, it has been confirmed that no noticeable losses of burden could be detected due either to the wind, even in the form of strong storms, or to heavy rains and thunderstorms.

The operation as stationary outdoor installation has proved to be particularly satisfactory for the so-called open mound with bottom electrode arrangement, the burden of which is loaded according to its natural charging cone without lateral and frontal enclosure by wall elements, for those furnaces have the added advantage that they can be made practically fully gas tight by a cover extending to the ground level, that if desired can be covered with a layer of moistened burden and that can be constructed as a collector apparatus with outlet ducts for the resulting gaseous reaction products according to copending application Ser. No 531,236 filed Dec. 10, 1974, and thus they meet all the requirements relative to environmental protection.

The distances between the individual furnaces and also the size of the furnaces proper are at the same time chosen as large as desired and the loading and stripping can be done with hydraulic, telescopic and bucket-type shovels, which cannot be used in the shop due to the space requirements. The expenses for the construction of the furnace room are in addition elminated.

By the stationary construction of the furnaces there are also eliminated all the annoyance factors that are unavoidable in movable furnaces due to the oscillations produced during transportation.

In order that the invention will be more clearly understood, it will now be described in greater detail, with reference to the accompanying drawings, wherein:

FIG. 5 is a simplified illustration of a furnace installation in accordance with a still further embodiment of the invention;

FIG. 6 is a cross-sectional view of the furnace installation of FIG. 5 taken along the lines V — V.

Figure 1:
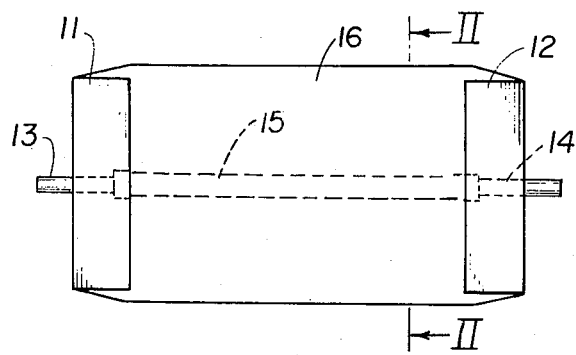
FIG. 1 is a simplified illustration of a top view of a furnace installation in accordance with one embodiment of the invention.
Figure 2:
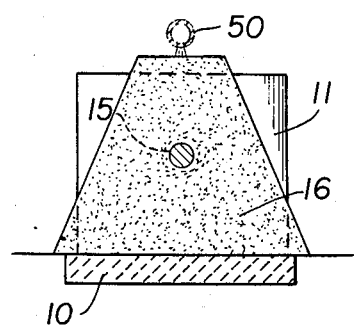
FIG. 2 is a cross-sectional view of the furnace installation of FIG. 1, taken along the lines II — II.

Referring now to the drawings, and more in particular to FIGS. 1 and 2, therein is illustrated a furnace installation having a furnace floor 10, and a pair of spaced-apart end walls 11 and 12. Electrodes 13 and 14 are provided in the end walls 11 and 12, respectively, and a resistive core 15 is provided extending between the electrodes 13 and 14, between the end walls, whereby the core 15 is electrically connected to the electrodes 13 and 14. In this arrangement, the furnace installation has no side walls, and the reacting burden, from which silicon carbide is formed, is formed as a pile 16 on the floor 10 of the furnace, and extending between the end walls 11 and 12, so that the resistive core 15 extends through the mound 16. The sides of the mound 16 are thus not limited, and hence are slanted in the shape in which they were poured and positioned entirely in the resistive core 15.

Figure 3:
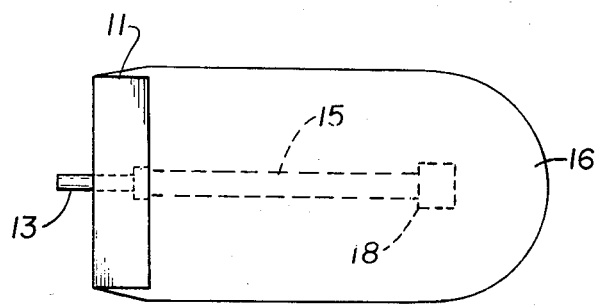
FIG. 3 is a simplified top view of a furnace installation in accordance with a further embodiment of the invention.
Figure 4:
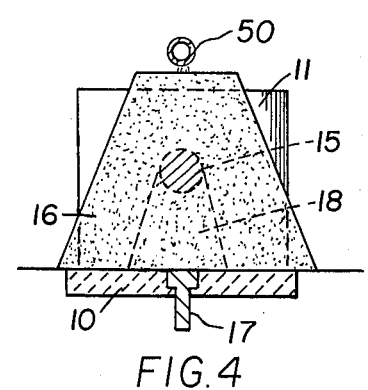
FIG. 4 is a cross-sectional view of the furnace installation of FIG. 3, taken along the lines IV — IV.

In the arrangement of FIGS. 3 and 4, only one end wall 11 is provided, and the electrode 13 is mounted in this end wall as in the arrangement of FIGS. 1 and 2. In the arrangement of FIGS. 3 and 4, however, a further electrode 17 is provided in the furnace floor 10, and a connecting member 18 vertically extends from the electrode 17, so that the resistive core 15 is electrically connected between the electrode 13 and the connecting member 18. The connecting member 18 may be in the form to be described with reference to the vertical connecting members in the arrangements of FIGS. 5 – 7.

Figure 7:
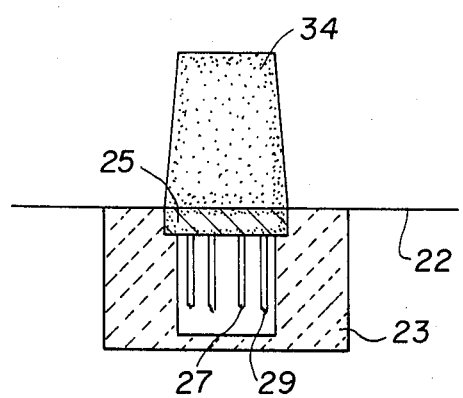
FIG. 7 is a cross-sectional view of the furnace installation of FIG. 5 taken along the lines VI — VI.

In the arrangements of FIGS. 3 and 4, the mound 16 of reacting ballast is limited laterally only by the end wall 11, so that the remaining sides thereof are slanted, for example, to have the inclination at which they are poured onto the furnace floor to surround the resistive electrode 15. In this arrangement, as in the arrangement of FIGS. 5 – 7, the vertical connection member has a resistance less than that of the core 15. In a still futher embodiment of the invention, as illustrated in FIGS. 5 – 7, the furnace installation has no end walls. In this arrangement, bottom electrodes 20, 21 of the furnace installation are located, for example, at ground level, as indicated by the lines 22. A suitable floor (not shown) may be provided for the installation at this level. The electrodes are provided with below ground enclosures 23, 24, having covers 25, 26, respectively, at ground level, so that the electrodes 20, 21 may be electrically connected, for example, by conductors 27, 28 respectively, within the below ground enclosures. If desired, cooling conduits (not shown) may be provided in the electrodes 20, 21, and connected by way of conduits 29, 30 to a suitable cooling system (not shown).

Connecting members 31, 32 are provided extending substantially vertically from the electrodes 20, 21, respectively, and a resistive core 33 extends between the connecting members 31, 32, respectively.

in the arrangement of FIGS. 5 – 7, which is disclosed and described in greater detail in application Ser. No. 531,236 the connecting members 31, 32 have a lower resistance than that of the core 33, and are provided with inclined sides. In such arrrangements, the ends of the resistive core 33 abut the slanted sides of the connecting members.

The mound 34 of reacting ballast is piled, in a natural pile, to surround the resistive core 33 and connecting members 31, 32, so that the sides of the mound may be inclined in the shape in which they were poured.

It will be apparent, of course, that, in accordance with the present invention, other electrode arrangements may be provided for applying current to the resistive core in the absence of end walls of the furnace installation.

In all of the arrangements in accordance with the invention, the furnace installations may be charged merely by pouring the reactive ballast onto the furnace floor, so that its unrestrained sides and ends are formed in their natural shape. The advantages of this arrangement, particularly for outdoor installations, has been discussed above.

The mound of ballast formed on the furnace floor may be sprayed, during operation, by any conventional means. For example only, as illustrated in the drawings, a pipe 50 may be provided extending over the mound, the pipe 50 having suitable apertures 51 as appear in FIG. 6, for directing liquids onto the mound.

While the invention has been disclosed and described with reference to a limited number of embodiments, it will be apparent that variations and modifications may be made therein, and it is intended in the following claims to cover each such variation and modification as follows within the true spirit and scope of the invention.

What is claimed is:

1. In an electrical resistance furnace operated by direct electric heating operation, the current being supplied by means of electrodes through a resistance core that is introduced in a reacting burden; the improvement wherein said furnace has no side walls and is a stationary outdoor furnace, comprising means for keeping the surface of the burden moist during the heating cycle of the furnace the cooling phase and the dismounting.

2. A process for heating a reacting burden in a resistance furnace of the type having a furnace floor and a resistive core adapted to pass current for the heating of a burden in the production of silicon carbide, comprising feeding said reacting burden in the form of a mixture of granular coke and quartz sand onto said furnace floor to cover said resistance core and form a mound, without laterally supporting the mound of burden on said furnace floor on at least two sides, passing current to said resistance core to heat said burden in said mound within the range of 1500°–2500° C, cooling said burden following the heating thereof by said resistance core, and stripping said furnace, and further comprising maintaining said burden moist during the heating cycle of the furnace, the cooling of the burden, and the stripping of the furnace.

\* \* \* \* \*

UNITED STATES PATENT OFFICE
CERTIFICATE OF CORRECTION

Patent No. 3,989,883         Dated November 2, 1976

Inventor(s) Gunter Wiebke, et al

It is certified that error appears in the above-identified patent and that said Letters Patent are hereby corrected as shown below:

In the Drawings, Figure 7: "34" should be --31--.

Column 2, line 28: "substantialy" should be --substantially--.

Column 3, line 16: Cancel "the" (first occurrence).

Column 4, lines 47 & 48: "resistive electrode 15" should be --resistive core 15--.

Column 6, line 13: After "furnace" insert a comma.

Signed and Sealed this

Sixteenth Day of May 1978

[SEAL]

Attest:

RUTH C. MASON
Attesting Officer

LUTRELLE F. PARKER
Acting Commissioner of Patents and Trademarks